Patented Oct. 5, 1948

2,450,814

UNITED STATES PATENT OFFICE 2,450,814

PROCESSES OF MAKING CHEESE

Zola D. Roundy and Havard L. Keil, Clarendon Hills, Ill., assignors to Armour and Company, Chicago, Ill., a corporation of Illinois No Drawing. Application March 1, 1943, Serial No. 477,634

11 Claims. (Cl. 99—116)

This invention relates to processes for preparing cheese products and relates particularly to those processes in which the action of proteolytic enzymes is utilized to develop cheese body characteristics.

In our copending applications Serial Numbers 462,307 and 462,308, filed October 16, 1942, which have now matured into Pat. No. 2,370,878, Mar. 6, 1945, and Pat. No. 2,370,879, Mar. 6, 1945, respectively we described processes for making cheese in which a proteolytic enzyme material is incorporated in the milk material and the enzyme acts to alter the protein structure so that a desired cheese body may be obtained in a relatively short time. So far as the cheese body is concerned, the action of the proteolytic enzymes in these processes takes the place of long ageing periods used in ordinary cheese making practice. The flavor of the cheese so produced through enzymic action by these processes has also been found to be entirely satisfactory.

Proteolyticenzyme substances are present in their natural environment in the unactive state and are called pro-enzymes or zymogens. These zymogens are incapable of splitting proteins and in order to make them useful it has always been considered necessary to "activate" them, converting them from zymogens to the active enzyme form. This conversion to the active state is effected by the addition of well known activating agents or merely by letting the substances stand until self-conversion or auto-activation takes place. Very small quantities of enzymes initially present in the zymogen substance may act as agents to convert small quantities of zymogens and self-conversion is at first very slow. As further enzymes are produced the conversions become more rapid, progressing at an accelerated rate. The initial quantity of enzymes necessary to start self-conversion may be present as impurities in the zymogen substances or may be formed in some manner not now entirely understood.

The unactive enzyme substances referred to herein must be distinguished from the enzyme materials which have spent themselves and are inactive, and also from the enzyme materials which have been permanently inactivated through treatment by heat, acids, alkali, or the like. Our unactive enzyme materials are not active but are capable of becoming active.

In the prior practices in cheese making where proteolytic enzymes have been utilized for developing body characteristics, the enzymes added to the milk material have been active. It has heretofore been supposed that the greater the activity of the enzymes the greater would be their benefit per unit of quantity added.

We have now found that markedly improved results may be had by incorporating the enzyme substance into the milk material in unactive form, preferably in the form of the zymogens.

We believe that some of the undesirable results hertofore obtained through the use of proteolytic enzymes in cheese making was due to unequal access of the enzymes to every part of the milk material. It seems likely that the enzymes when added to the mixture may have attacked and attached themselves to the first protein matter contacted and were not dislodged from this matter even upon thorough mixing, so that some particles were affected excessively while others were not affected sufficiently. Those particles affected excessively may have been broken down to the extent that some objectionable flavors or odors were developed, and those particles not affected sufficiently had improper development of the desired body characteristics.

By incorporating the enzyme substances in unactive form it appears that they become distributed and disbursed freely throughout the mass. Then when they become active the attack is made uniformly against all protein matters in the mass. The effect is to avoid the localized action in small areas and to produce uniform action throughout the whole material.

For convenience of description we employ the term "milk" to designate the material acted upon through the treatment steps up to the point of coagulation, and use the term "milk material" to designate the material acted upon from the beginning of the process through coagulation to the stage where curd body development is completed.

A more detailed description of specific ways of practicing the invention will now be given.

To the milk, which may be pasteurized or unpasteurized, a lactic acid starter is added as in the usual procedure. This starter usually includes *Streptococcus lactis* and *Streptococcus*

*citrovorus* and *Streptococcus paracitrovorus*, these being heat sensitive organisms.

The enzyme substance may then be added to the milk and thoroughly mixed therein. As before stated, it is then proteolytically unactive and disperses freely throughout the mass. Advantageously the enzyme substance may be the zymogen mixture of animal pancreas glands prepared as set forth in the application Serial No. 427,386, filed January 19, 1942, covering an invention by Havard L. Keil which has now become abandoned. Such a zymogen mixture may contain as substantial constituents trypsinogen and chymotrypsinogen.

We can use any of the proteolytic zymogens of the pancreas. It is possible to use the individual zymogens such as trypsinogen or chymotrypsinogen, but we find it more advantageous to use the mixtures of these zymogens. For example, a substance containing trypsinogen and chymotrypsinogen is preferable to one which contains only one of these zymogens. However, we prefer that the enzymes steapsin and amylopsin be excluded from the mixture used, and these may be excluded in the manner set forth in the aforementioned application Serial No. 427,386. As disclosed in this prior application, the zymogens, free of steapsin and amylopsin, may be prepared by treating animal pancreas glands with water at a temperature of not more than 40° F. and at a pH of from 2.5 to 4.5 until the steapsin and amylopsin are destroyed, and then recovering the aqueous solution.

We prefer to use an activating agent for converting the zymogens after they have been mixed in the milk. The activating agent may be of any kind normally used to activate pancreatic proteolytic zymogens. Enterokinase, trypsin, cathepsin, or certain salts such as magnesium sulphate may be used. Such enzymes may be added to the milk, preferably after the addition of the zymogens, but may also be added prior to the incorporation of the zymogens. Also, the activating agent may be admixed with the zymogen substance prior to its introduction into the milk if the mixture is handled so as not to effect activation of the zymogens before they are admixed. This could be accomplished by keeping the mixture at low temperature or by handling the mixture so rapidly that there is substantially no activation until the zymogens are admixed in the milk. The best practice is to add the zymogen substance and the activating agent separately at about the same time.

If the zymogen substance is substantially pure, that is, having substantially no active enzymes, it is usually most desirable to employ enterokinase or some other activating agent, but if it already contains some enzyme as an impurity, further addition of some activating agent may not be needed and an auto-activation of the zymogen substance may be relied upon.

We have found that enterokinase, which is an enzyme obtained from the animal duodenum, is a very good activating agent in our process. An especially efficient combination is the use of the mixed zymogens of the pancreas with enterokinase employed as an activating agent. In this case we are making use of the natural mixture of animal tryptic zymogens along with the specific activating agent which in the natural physiological functions activates these zymogens.

Whether we add some specific activating agent or obtain auto-activation, we convert the zymogen to the enzyme after it has been incorporated in the milk. As previously explained, we may do this by utilizing added activating substances or simply by allowing the change to take place as the cheese making method proceeds.

As set forth in our application Serial No. 462,307, the combination of tryptic enzymes and pepsin, and other combinations of enzymes is advantageous, and by employing zymogens as the proteolytic substances added it is more convenient to employ such combinations. For example, pro-pepsin or pepsin and the zymogens of pancreas may be combined in one mixture and in this case there will be no destruction of pepsin by trypsin as would be the case if these substances were in the enzyme form. This mixture may then be incorporated in the milk material adding all the proteolytic enzyme substances at a single time. Alternately, the zymogens and pepsin material may be added separately.

In a preferred practice we add to the milk zymogens of animal pancreas, pepsin, and a small amount of enterokinase. The enterokinase need only be in sufficient amount to effect conversion of the pancreatic zymogens to the active enzymes in a desired length of time, and the rate at which the zymogens assume the active form may be governed somewhat by the amount of the activating agent employed.

It is more practical to add the enzyme substances to the milk and though it is possible to add them to the milk material after coagulation the mechanical difficulties in getting the substances thoroughly admixed with the milk curd already formed makes this practice less desirable.

Coagulation of the proteins to form curd may be effected by the addition of rennin as in the usual practice. Pepsin may be used but rennin is by far the better coagulating agent. The rennin may be added separately to the milk or may be added in the zymogen substance. The temperatures of the milk at this point may be about 84° F. to 88° F. Next the curd is cut and cooked at the usual temperatures of about 90° F. to 101° F.

After cooking the curd we prefer to heat it in the presence of the whey to a higher temperature within the range which will inhibit further action of the acid-forming bacteria and at the same time enhance the action of the enzymes which form from the added zymogens. We may heat to a temperature of from 106° F. to 128° F. and desirably within the range of 110° F. to 120° F. It is important not to heat above 128° F. at this step since higher temperatures may inactivate the enzymes. Temperatures within this range may be maintained for about 10 or 15 minutes, then the whey is drawn and the curd allowed to mat. The curd may then be cut in slabs and put in storage for two days to a week or more, the length of storage depending somewhat on the storage temperature, the degree of body development desired, personal taste, convenience, etc.

By the terms "body characteristics" or "body development" as used herein, we refer to the consistency, firmness or substance of the curd or cheese. A well-bodied cheese will feel firm and smooth as distinguished from pasty, mealy, crumbly, etc., these evidences of body being well known in the cheese making trade. Body characteristics can be identified by melting the curd, and a curd which upon application of heat and with the usual salt added will melt to form a smooth, free-flowing mass as distinguished from a stringy, ropy or solid mass has fully developed body characteristics.

At the end of the storage period the cheese having fully developed body is admixed with salt and other desired condiments and heated in a suitable vessel to about 130° F. to 150° F. and the molten cheese is then poured into packages and allowed to cool. Conveniently other cheeses may be blended in at this heating step if so desired. This heating step serves to inactivate the enzymes formed from the added zymogens.

Following is a specific operation of the processes of the invention:

To 1000 pounds of milk there is added about 1% of a lactic starter in the usual way to ripen the milk. One pound of a zymogen substance obtained from pancreas glands having substantially no steapsin or amylopsin is added to the milk material. 0.04 pound of pepsin having a strength of 1:3000 U. S. P. is then added and thoroughly mixed with the milk material. 3 ounces of rennin having the strength of about 1:5000 is added to the milk material at a temperature of 87° F., and coagulation takes place rapidly. The curd so formed is cut with ¼" curd knives and brought to a cooking temperature of 100° F. in accordance with the usual methods. When the curd has formed sufficently and the whey tests about .17% as lactic acid, the temperature is increased to about 115° F. and this temperature maintained for about ten minutes. Then the whey is drawn and the curd permitted to mat, after which it is cut up into blocks or slabs and stored in a cooler at about 35° for five days. When removed from the cooler storage the cheese has fully developed body characteristics and the flavor is set. The curd is then heated to about 150° F. and the usual amount of salt added with a small quantity of sodium citrate as an emulsifier. The molten cheese is then thoroughly agitated, poured into packages, and allowed to cool.

Where an activating agent is added, an enterokinase preparation in the amount of about 10 to 50% of the amount of the zymogen substance may be added to the milk in the above specific example.

It is also possible to admix proteolytic pancreatic enzymes such as trypsin, chymotrypsin, or pancreatin to the milk material while restricting the temperature of the milk material to a degree insufficient to permit enzyme activity, and to then raise the temperature to a point within the range of activity of the enzyme. In this way results are obtained in a large measure comparable to those obtained by the use of the zymogen substances. An example of this practice is as follows:

136 pounds of milk are placed in a cheese vat and 1% of a standard cheese starter added. 13.6 grams of a pancreatic enzyme paste in about 20 cc. of water and containing active pancreatin is then admixed with the milk material. The temperature of the milk is held at 44° F. and not more than 50° F. prior to and during the time of adding the enzyme. The temperature is then increased to 87° F. and 2.7 grams of pepsin testing 1:3000 U. S. P. added. 10 ccs. of standard rennin solution is also added. The curd sets and is then cut and cooked at 102° F. The temperature is then raised to 115° F. and the whey drawn off. After drawing the whey the curd is cut into slabs and stored for a period of about five days, after which it is heated to 150° F. and the usual amount of salt added with a small amount of sodium citrate as an emulsifier. The molten cheese is then thoroughly agitated, poured into packages, and allowed to cool.

The foregoing detailed descriptions have been given for explanation only and it is understood that many other changes and variations may be made in the manner of practice within the knowledge of the art and without departing from the scope of the invention.

What we claim as new and desire to secure by Letters Patent is:

1. In a process for preparing a cheese product in which proteolytic enzymes are utilized to develop cheese body characteristics, the step of incorporating into the milk material a proteolytic enzyme substance which is potentially active but which is in an unactive state.

2. In a process for preparing a cheese product in which proteolytic enzymes are utilized to develop cheese body characteristics, the step of admixing into the milk material a pancreatic zymogen substance.

3. A process as in claim 2 in which said pancreatic zymogen substance includes trypsinogen and chymotrypsinogen.

4. In a process for preparing a cheese product in which proteolytic enzymes are utilized to develop cheese body characteristics, the step of admixing into a milk material a zymogen substance which contains a small amount of an enzyme.

5. In a process for preparing a cheese product in which proteolytic enzymes are utilized to develop cheese body characteristics, the step of admixing into a milk material a zymogen substance and also an activating agent capable of catalyzing the conversion of zymogens to enzymes.

6. In a process for preparing a cheese product in which proteolytic enzymes are utilized to develop cheese body characteristics, the steps of admixing into a milk material a potentially active proteolytic enzyme substance at a temperature below the range of temperatures at which said enzyme substance has any substantial activity, and thereafter heating said material to a temperature within said range to bring said substance into activity in situ.

7. In a process for preparing a cheese product in which proteolytic enzymes are utilized to develop cheese body characteristics, the steps of incorporating into the milk material a zymogen normally contained in animal pancreas glands, converting said zymogen to an active enzyme, and after the active enzyme has acted to develop body characteristics heating said material to inactivate said enzyme.

8. In a process for preparing a cheese product in which proteolytic enzymes are utilized to develop cheese body characteristics, the steps of admixing into the milk material a proteolytic enzyme substance which is potentially active but which is in an unactive state, converting said zymogen to an active enzyme, heating the milk material in the presence of the whey and said enzyme to a temperature of from 106° F. to 128° F., withdrawing the whey, and after a storage period heating the curd to inactivate said enzyme.

9. In a process for preparing a cheese product in which proteolytic enzymes are utilized to develop cheese body characteristics, the step of admixing into the milk material a zymogen substance which is free of steapsin and amylopsin.

10. In a process for preparing a cheese product in which proteolytic enzymes are utilized to develop cheese body characteristics, the step of admixing into the milk material a zymogen substance which includes the mixture of zymogens contained in natural animal glands and which is substantially free of steapsin and amylopsin.

11. In a process for preparing a cheese product in which proteolytic enzymes are utilized to develop cheese body characteristics, the steps of mixing into the milk material a zymogen substance containing zymogens of animal pancreas glands, and adding enterokinase to the milk material containing the mixed zymogen substance.

ZOLA D. ROUNDY.
HAVARD L. KEIL.

REFERENCES CITED

The following references are of record in the file of this patent:

UNITED STATES PATENTS

| Number | Name | Date |
| --- | --- | --- |
| 268,245 | Lahrmann | Nov. 28, 1882 |
| 597,378 | Backhaus | Jan. 18, 1898 |
| 1,414,213 | Sanna | Apr. 25, 1922 |
| 1,474,542 | Monrad | Nov. 20, 1923 |
| 1,704,458 | Brehm | Mar. 5, 1929 |
| 1,708,099 | Kernen | Apr. 9, 1929 |
| 1,745,962 | Thompson | Oct. 21, 1927 |
| 2,115,505 | Conquest | Apr. 26, 1938 |

OTHER REFERENCES

"Enzymes," by Waksman & Davison, 1926, published by The Williams & Wilkins Co., Baltimore, pages 67, 265, 266.

"Experimental Enzyme Chemistry," by H. Tauber, 1936, published by Burgess Pub. Co., Minneapolis, Minn., pages 36 to 42.

Journal of Dairy Science, Nov. 1938, pages 729 and 747, "Soft Curd Milk," by F. J. Doan.

Journal of Dairy Science, July 1939, pages 521, 522, 524, "The Use of Steapsin in the Manufacture of Blue Cheese," by Coulter & Combs.

U. S. Dept. of Agriculture, Bur. of Animal Industry, Bulletin No. 62, published 1904 "The Relation of Bacteria to the Flavors of Cheddar Cheese," by L. A. Rogers, pages 35 to 37.